United States Patent [19]

Maeda et al.

[11] Patent Number: 5,351,148
[45] Date of Patent: Sep. 27, 1994

[54] OPTICAL TRANSMISSION SYSTEM

[75] Inventors: Kazuki Maeda, Sakai; Naoki Ishiyama, Osaka; Hiroaki Nakata, Hirakata, all of Japan

[73] Assignee: Matsushita Electric Industrial Co., Ltd., Osaka, Japan

[21] Appl. No.: 67,217

[22] Filed: May 26, 1993

[30] Foreign Application Priority Data

Jan. 25, 1993 [JP] Japan .................................. 5-9725

[51] Int. Cl.$^5$ .......................................... A04J 14/02
[52] U.S. Cl. ................................. 359/124; 359/133; 359/182; 359/181; 371/5.1; 375/39
[58] Field of Search ......................... 359/124–126, 359/132–133, 157, 181–182; 370/69.1; 371/5.1; 375/39; 358/86

[56] References Cited

U.S. PATENT DOCUMENTS

| | | | |
|---|---|---|---|
| 4,953,156 | 8/1990 | Olshansky et al. | 359/132 |
| 4,961,190 | 10/1990 | Nakajima | 371/5.1 |
| 5,016,242 | 5/1991 | Tang | 359/124 |
| 5,020,049 | 5/1991 | Bodeep et al. | 359/124 |

OTHER PUBLICATIONS

Koscinski, J.,"Feasibility & Multi-Channel VSB/AM Transmission on fiber Optic Lines", General Optronies Copporation, 1987, pp. 1–9.
"80–Channel AM–FDM TV Signal Optical Transmission Systems", by Tanabe et al., National Technical Report, vol. 36, Dec. 1990.
"TV Channel Capicity of Lightwave Multichannel, AM SCM Systems as Limited by Laser Threshold Nonleniarity", pp. 18–19, by C. J. Chung et al., Optical Communication Conference, Mar. 1992.
"Multichannel M-QAM for CATV Distribution", WB4, pp. 21–22, I.M.I. Habbab, Leos Summer Topical Meeting Digest, Jul. 29,1992.
"Digital Communications", by J. G. Proakis, Mac-Graw-Hill Series in Electrical Engineering, Second Edition, 1989/1983, pp. 278–285.

Primary Examiner—Richard E. Chilcot, Jr.
Assistant Examiner—Kinfe-Michael Negaph
Attorney, Agent, or Firm—Price, Gess & Ubell

[57] ABSTRACT

An optical transmission system provides digital signals which have added bits for error correction by an encoder which are converted into 16-QAM signals with a predetermined carrier frequency by a modulator, and then frequency division muitiplexed with an AM signal so as to be inputted to an optical-electric converter. When the total sum of the light modulation indices of signals to be transmitted is over 1, a light modulation index of an M-QAM signal is set by calculating the light modulation index that marks the onset of diverging from the error rate given by a ratio between receiver noise power and the M-QAM signal power while considering a light modulation index corresponding to a usable transmission margin. The multiplexed signals are transmitted via optical fiber and converted into electric signals by a photo receiver, demodulated by a demodulator, and then outputted after having their errors corrected by an error corrector.

17 Claims, 5 Drawing Sheets

OPTICAL TRANSMISSION SYSTEM

BACKGROUND OF THE INVENTION (1) Field of the Invention

This invention relates to an optical transmission system for transmitting frequency division multiplex signals used for the CATV system and other systems.

(2) Description of the Related Arts

According to the CATV system, multichannel TV signals which have been frequency division multiplexed are converted into optical signals and transmitted to a receiver via a single transmission line. The receiver, on the other hand, distributes received optical signals into different channels to demodulate.

The CATV system utilizes an optical transmission system because this permits the use of a laser diode (hereinafter referred to as LD) as an optical converter. An LD, which has very low distortion factor attributable to its good linearity, can perform excellent transmission as well as reducing carrier-to-noise ratio (hereinafter referred to as CNR). Such feature of LDs is described in "80-Channel AM-FDM TV Signal Optical Transmission System" by Tanabe et. al. in "National Technical Report Vol. 36, No. 6, Des. 1990", and "TV channel capacity of lightwave multichannel AM SCM systems as limited by laser threshold nonleniarity" pp.18–19 by C. J. Chung and I. Jacobs in Optical Communication Conference, March 1992. The latter-mentioned document says that LDs have excellent distortion characteristics even when multiplexed signals whose total sum of light modulation indexes is more than 1 are transmitted.

Nowadays, providing a much larger number of channels in the CATV system has been proposed to offer a wider range of services.

If VSB-AM signals of an analog modulation system, which have been already used for the present channels, are further used for channels to be added, the total sum of the levels of all the VSB-AM signals will exceed permissible amplitude, or a linear region of LDs as a light converter because these signals are susceptible to noises when required to raise their levels. Thus, the number of channels able to be added is limited; if LDs are already used for almost the entire amplitude for the present channels, no more channel can be added in such a system.

A proposal has been made to realize that as many channels as desired can be added if signals modulated by M-ary Quadrature Amplitude Modulation (hereinafter referred to as M-QAM) are used for the additional channels and then these M-QAM signals are frequency division multiplexed together with VSB-AM signals for the present channels. Such idea is disclosed, for example, in "Multichannel M-QAM for CATV Distribution" WB4 pp. 21-22 by I. M. I. Habbab, LEOS Summer Topical Meeting Digest, Wednesday, July 29, 1992.

The reason that the use of the M-QAM signal permits an increase in number of the channels as desired is as follows:

QAM signals express information to be transmitted both by amplitude and phases, which enables the information to be transmitted with a small amplitude. In addition, QAM is a type of a digital modulation system in which M-divided information is expressed, so that the signal is harder to be affected by noises than those of the analog modulation system, thus performing excellent transmission with small CNR.

A theoretical analysis between the CNR of QAM signals and its error rate is given in "Digital Communications" MacGraw-Hill Series in Electrical Engineering Second Edition, pp. 278-285 by J. G. Proakis. According to this book, maintaining a predetermined error rate automatically determines a CNR. Therefore, when it is desired to increase the number of channels in the CATV system, the device of each channel can be designed so that a CNR to maintain an error rate required as a system meets the CNR of J. G. Proakis. Since a CNR corresponds to the light modulation index of the signal, the modulation index of the modulator can be adjusted to a predetermined error rate.

However, the inventors of this invention actually multiplexed AM signals together with 16-QAM signals and experimentally transmitted them under the condition that the total sum of their light modulation indexes is beyond 1. And it was revealed through the experiment that the error rate of the 16-QAM signals had no such theoretical relation with a CNR, or a light modulation index as J. G. Proakis says, and that Guaranteeing the required error rate demands to increase the levels of the QAM signals so as to obtain quite a large SNR or light modulation index. Accordingly, to increase the levels of QAM signals sets limits to the number of channels being added as long as the amplitude of LDs is not changed.

SUMMARY OF THE INVENTION

In view of the foregoing problems, a first object of this invention is to provide a method of rationally setting the modulation index of one of a plurality of modulation signals including two or more different types of signals such as an AM signal and a QAM signal that are frequency division multiplexed and transmitted.

A second object of this invention is to provide an optical transmission system, in which, when a plurality of modulation signals including two or more different types of signals such as an AM signal and a QAM signal are frequency division multiplexed and transmitted, the number of each type can be increased as desired even with the limitation of the amplitude of the light modulation device such as an LD.

A third object of this invention is to provide an optical transmission system suitable for the multichannel CATV.

The first object can be achieved by a method of setting a light modulation index in an optical transmission system that frequency division multiplexes a plurality of modulation signals including at least one digital modulation signal, and that light intensity modulates the multiplexed signals whose total sum of modulation indexes is beyond 1. The method comprises the steps of: finding a curve indicating the relationship between a light modulation index and an error rate including an inflection point from which the error rate does not decrease any more even if the light modulation index of the digital modulation signal is increased; and determining the light modulation index of the digital modulation signal by the use of the found curve.

The digital modulation signal may be an M-QAM signal.

The curb may be found by an equation below:

$$p^{(I+G)}(e) = \qquad (1)$$

$$\frac{2(M - \sqrt{M})}{M} \exp(-A) \sum_{j=0}^{\infty} \frac{A^j}{j!} \operatorname{erfc}\left( \frac{\sqrt{CNR}}{\sqrt{2} \, (\sqrt{M} - 1) \, \sigma_j} \right)$$

wherein M is the M in the M-QAM signal, A is an impulse index, which is the product between the duration of one momentary distortion and the number of momentary distortions per unit time, $\sigma_j^2$ is $(J/A + G')/(1 + G')$ and $G'$ is the ratio between an average thermal noise power ($\sigma_G^2$) and an average momentary distortion power($\sigma_J^2$).

The curve may be made by applying different light modulation indexes of the digital modulation signal for the transmission and then actually measuring the error rate in each of the light modulation indexes at the side of a receiver.

The modulation signals may include AM signals and the light modulation index of the AM signals may be larger than the light modulation index of the M-QAM signal.

The first object can be achieved also by a method of setting a light modulation index of an M-QAM signal in a CATV system that frequency division multiplexes an AM signal in a channel and an M-QAM signal in another channel, and that light intensity modulates thus frequency division multiplexed signals under the condition that the total sum of the light modulation indexes of each of the signals is 1 or more. This method comprises the same steps as the above-mentioned method.

The second object can be achieved by an optical transmission system that light intensity modulates a plurality of modulation signals including at least one digital modulation signal whose total sum of modulation indexes is beyond 1. This system comprises a modulation device for generating a plurality of modulation signals; a frequency division multiplex device for frequency division multiplexing all the modulation signals; a light intensity modulation device for light intensity modulating the frequency division multiplexed signals; and a modulation index adjustment device for adjusting the light modulation index of the digital signal. The index is set by calculating the light modulation index that marks the onset of diverging from the error rate given by the ratio between receiver thermal noise power and received signal power, while considering a light modulation index corresponding to a usable transmission margin.

The digital modulation signal may be an M-QAM signal and the modulation device may include a modulation unit modulating the QAM signal.

The light intensity modulation device may be composed of a laser diode and a driving unit for the laser diode.

The above-mentioned optical transmission system may further comprise an error rate correction device at the receiver side of intensity modulated light.

The third object can be achieved by a CATV system that frequency division multiplexes an AM signal in a channel and an M-QAM signal in another channel and light-intensity modulates thus multiplexed signals to transmit. This CATV system comprises: an ammodulation device for generating an AM signal at a predetermined channel; an M-QAM modulation device for Generating an M-QAM signal at another channel; a frequency division multiplex device for frequency division multiplexing the signals of each of the channels; a light intensity modulation device for modulating the light intensity by the multiplexed signals; and a light modulation index adjustment device for adjusting the light modulation index of the M-QAM signal. The index is set by calculating the light modulation index that marks the onset of diverging from the error rate Given by the ratio between receiver thermal noise power and received signal power, while considering a light modulation index corresponding to usable transmission margin.

The light intensity modulation device may be composed of a laser diode and a driving unit for the laser diode.

The curve may be made by applying different light modulation indexes of the digital modulation signal for the transmission and then actually measuring the error rate in each of the light modulation indexes at the side of a receiver.

The CATV system may further comprise an error rate correction device at the receiver side of intensity modulated light.

The superiority of this invention over the related arts is described as follows:

In an optical transmission system multiplexing AM signals with M-QAM signals and transmitting them, when the total sum of the light modulation indexes of signals to be transmitted is about 2.1 and when the transmission performance of the AM signals satisfies the quality required, if the M-QAM signals are further multiplexed and transmitted, the error rate of the M-QAM signals (16-QAM signals in this case) is decreased as shown in FIG. 1 due to the affect of the AM multiplexed signals which are transmitted at the same time. Thus, the error rate is not improved by increasing a CNR being received by increasing the light modulation indexes of the M-QAM signals. In order to achieve a fairly low error rate, the light modulation indexes of M-QAM signals must be set so that a much greater CNR than thought before can be obtained.

Decrease of the error rate of 16-QAM signals seems to result from momentary distortion caused by clipping, that is, the current value of multiplexed signals diminishes below the threshold. Although such distortion characteristics have never been argued before, it is inevitable when signals are transmitted by directly intensity-modulating LDs and when the total sum of the light modulation indexes of signals to be transmitted is 1 or more. In addition, this phenomenon Greatly affects transmission performance when digital modulation signals such as M-QAM signals are transmitted at the same time. Such momentary distortion is measured as follows: when the total sum of the light modulation indexes of signals to be transmitted is about 2.1, the distortion in a channel composed of 16-QAM signals has a large maximum value as shown in FIG. 2. Furthermore, when hourly surging of noise output level in the 16-QAM channel is measured under the same conditions except for the Carrier of the 16-QAM, the surging of momentary noise level as shown in FIG. 3 is observed. This is the momentary distortion caused by clipping.

As cited in the documents written by Tanabe et. al., C. J. Chung, and I. Jacobs, what eventually determines the amount of distortion when LD lights are directly transmitted by frequency division multiplexed signals is clipping. In an optical transmission system which is transmitting frequency division multiplexed signals such as AM-FDM TV signal transmission devices, these lights are generally transmitted under the conditions to induce clipping. If M-QAM signals are multiplexed and transmitted under the condition that the total sum of the light modulation indexes of signals being transmitted is 1 or more, the relationship between CNR and the error rate cited in the document of J. G. Proakis is not realized.

In addition, if LD lights are directly intensity modulated by frequency division multiplexing a large number of signals demanding the setting of a large modulation index such as AM signals, together with M-QAM signals, the channels can not be increased in number when a predetermined error rate is achieved under the conditions satisfying the transmission performance of the AM signals. On the other hand, if the error rate is lowered by setting a large light modulation index of M-QAM signals, the amount of distortion increases, so that a good transmission performance of the AM signals being transmitted at the same time cannot be secured. Hence, it is impossible to predict a method of setting an appropriate index of light modulation and the error rate if the channels are increased in number while keeping the low light modulation rate of M-QAM signals and the transmission performance of the AM signals.

According to this invention, with the use of the equation (1), a light modulation index is found that marks the onset of diverging from the error rate given by the ratio between receiver noise power and received QAM signal power, while considering a light modulation index corresponding to a usable transmission margin, thus properly setting the light modulation index of the QAM signals.

In the case that the error rate of M-QAM signals, set with the above light modulation index, is smaller than a predetermined error rate, errors of demodulated digital signals are corrected to meet the error rate.

In the case that M-QAM signals are multiplexed and transmitted under the conditions to induce clipping, when the light modulation index of the M-QAM signals is small, or the ratio between receiver noise power and received M-QAM signals power is small, the error rate is dominated by the receiver noise power as apparent from the equation (1), and the error rate is given by the ratio between receiver noise power and the received M-QAM signals power. However, increasing the light modulation index of the M-QAM signals allows momentary clipping-induced distortion to be dominant, the error rate being apart from the one found by the ratio between the receiver noise power and the received M-QAM signals power. Furthermore, errors caused by the momentary clipping-induced distortion are not much improved by increasing the light modulation index.

Therefore, a light modulation index set by calculating the light modulation index that marks the onset of diverging from the error rate given by the ratio between receiver noise power and the M-QAM signal power while considering a light modulation index corresponding to a usable transmission margin becomes a most efficient index, or minimum required index of light modulation in terms of error rate and the amount of distortion of the optical transmission system. Even if signals whose light modulation indexes have been thus set are multiplexed with other signals that need to set large light modulation indexes, the current value of signals to be inputted to LDs is not much changed, as compared with the latter-mentioned signals needing to set large light modulation index being exclusively multiplexed. As a result, there is little change in the amount of distortion. In addition, the error rate of M-QAM signals can be improved by correcting errors to obtain a desired value.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1:
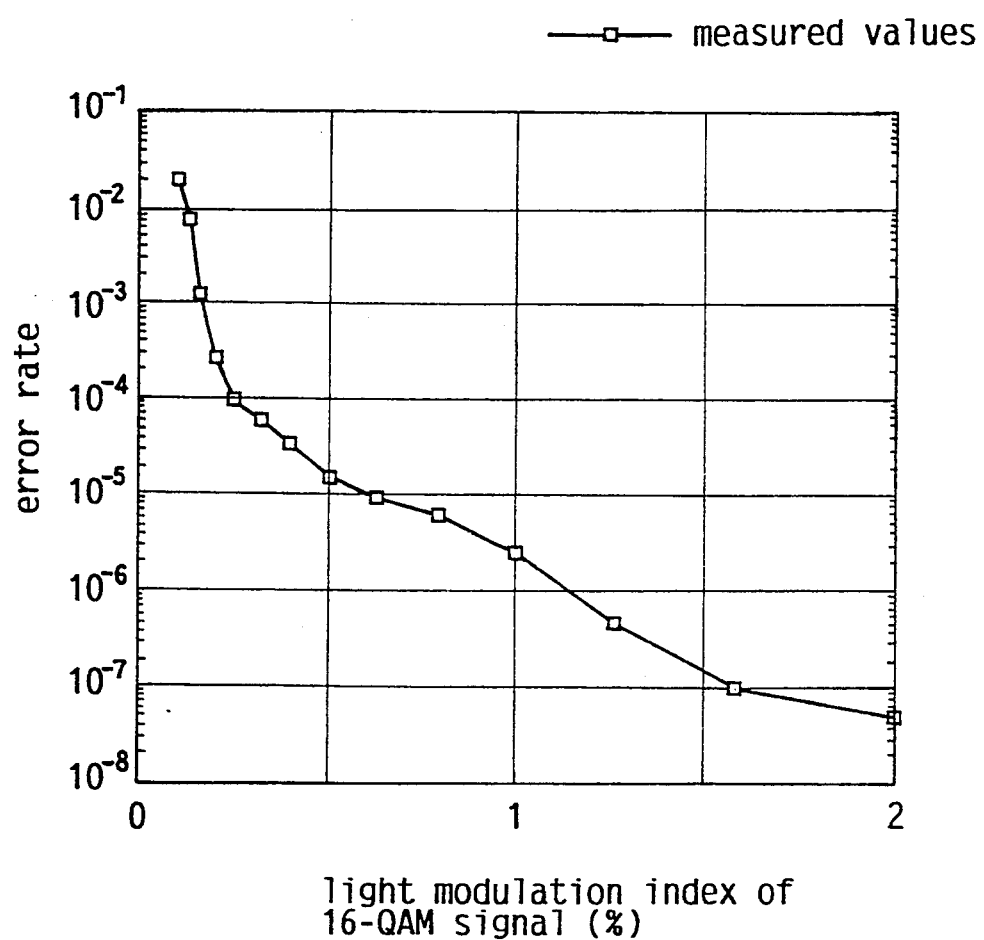
FIG. 1 is a graph showing actually measured values of the error rate according to the light modulation indexes of 16-QAM signals transmitted when the total sum of the light modulation indexes of signals to be transmitted is 2.1.
Figure 2:
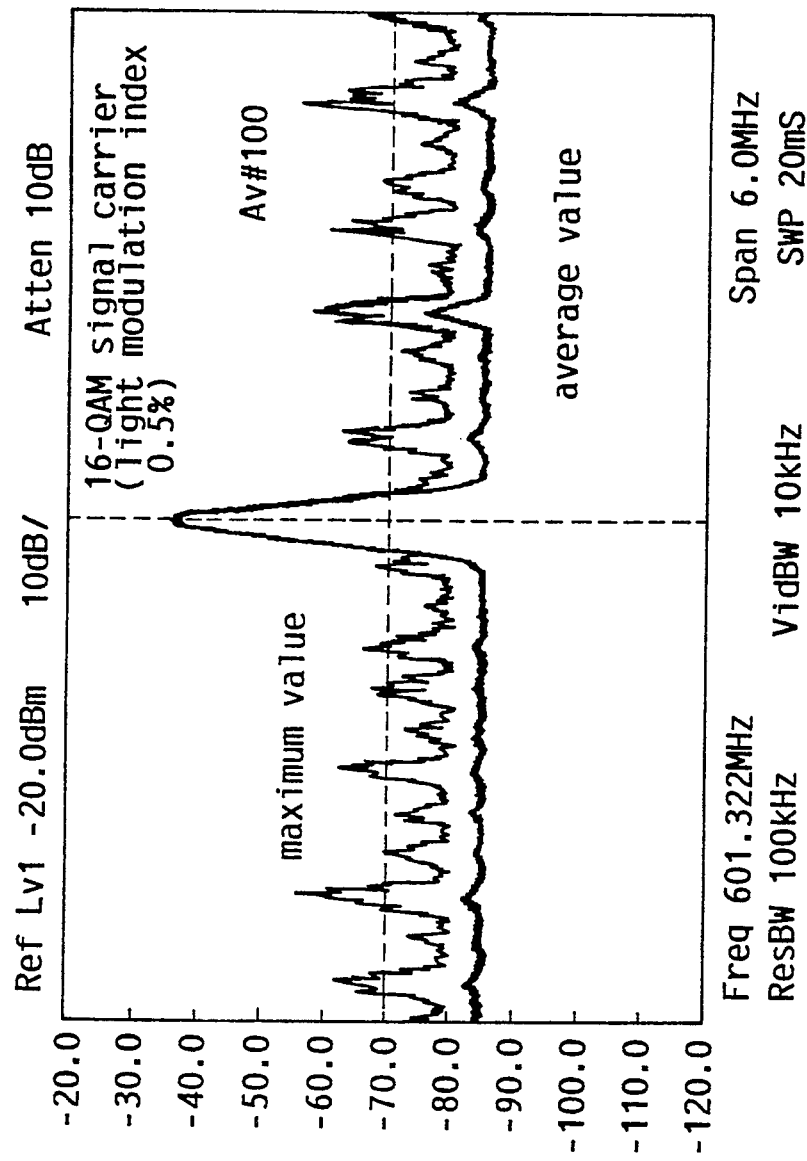
FIG. 2 is a Graph showing the spectrum in a 16-QAM channel when 16-QAM signals are transmitted under the condition that the total sum of the light modulation indexes of signals to be transmitted is 2.1.
Figure 3:
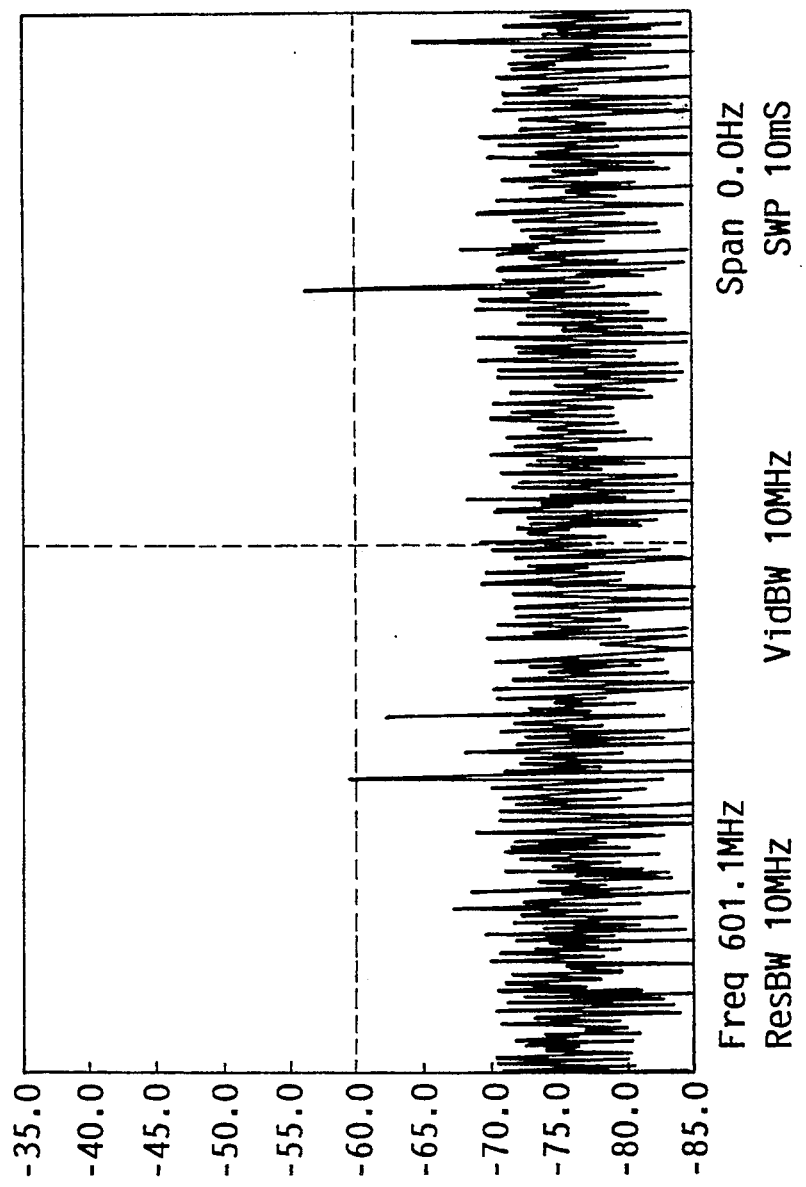
FIG. 3 is a Graph showing the hourly surging of noise output in a 16-QAM channel when 16-QAM signals are transmitted under the condition that the total sum of the light modulation indexes of signals to be transmitted is 2.1.
Figure 4:
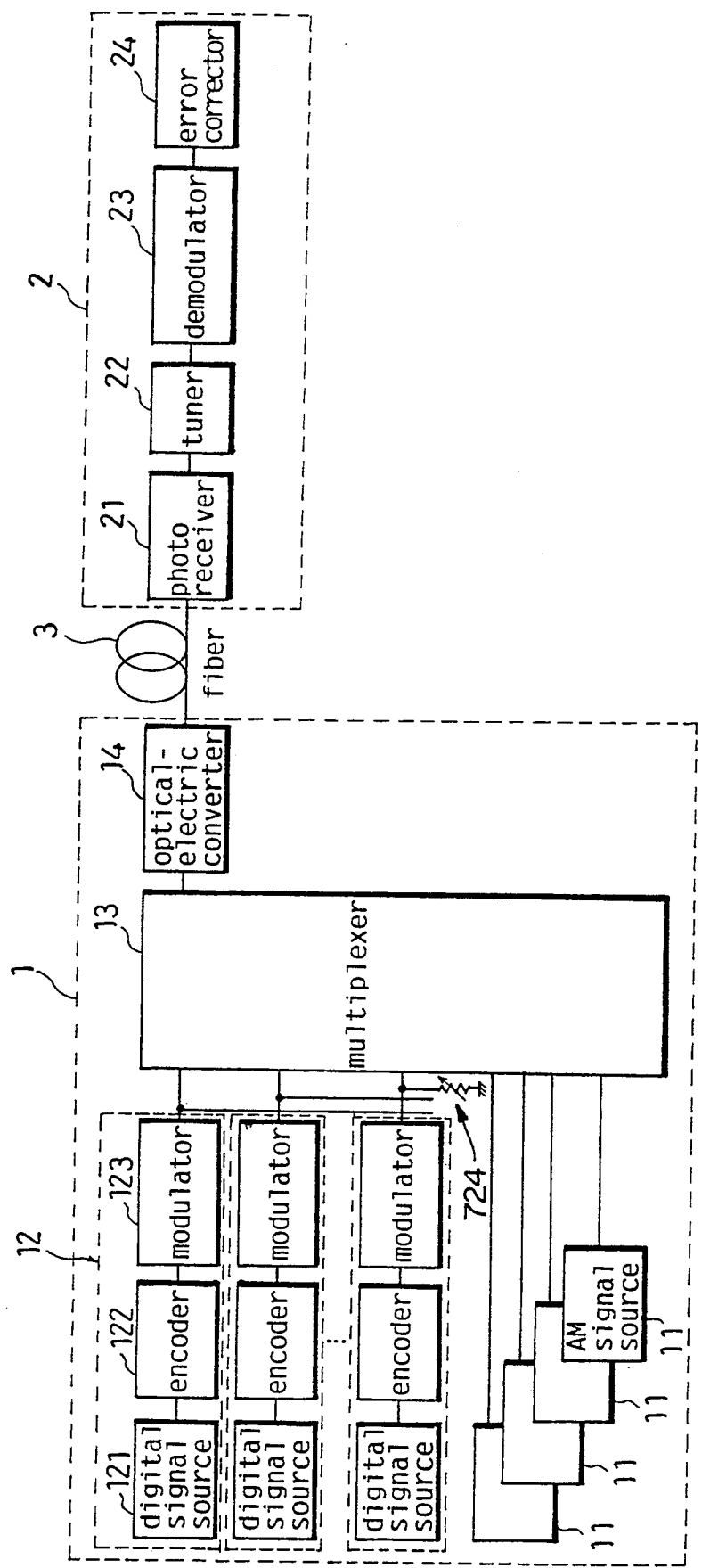
FIG. 4 is a block diagram according to an embodiment of this invention.

The optical transmission system of this embodiment is shown in FIG. 4 which includes a transmitting station 1, a receiving station 2, and optical fiber 3 optically connecting both stations.

The transmitting station 1 consists of a plurality of AM signal sources 11. Generating AM modulation signals, a plurality of QAM signal sources 12 generating, for example, 16-QAM modulation signals, a multiplexer 13 to frequency division multiplex each signal of the AM signal sources 11 and QAM signal sources 12, and an optical-electric converter 14 such as LD.

Since the function of the AM signal sources 11 amplitude-modulating signals to be transmitted is well known, it is not described in detail.

Each of the QAM signal sources 12 consists of a digital signal source 121 generating information to be transmitted as digital signals, an encoder 122 generating bits for error correction to the digital signals, and a modulator 123 converting digital signals into 16-QAM signals having a predetermined carrier frequency by a predetermined index of modulation. The index of modulation of the modulator 128 can be adjusted by an adjuster 124.

The receiving station 2 consists of a photo diode 21 as a photo receiver to covert optical signals sent through the optical fiber 8 into electric signals, a tuner 22 to select designated signals out of multiplexed signals, which have been converted into electric signals, a demodulator 23 demodulating 16-QAM signals into digital signals, an error corrector 24 correcting errors of digital signals demodulated. This error corrector 24, which is used when the error rate of the 16-QAM signals can not be as small as required as a system, is not integral to this invention.

The index of modulation of the modulator 123 is set as follows:

First, a light modulation index of AM signals is determined that satisfies both a required CNR to be received and the amount of distortion required as AM signals. Then, with thus determined index, it is judged through the equation (2) below whether a required error rate is easily attainable or not for the light modulation of 16-QAM signals. When it is not easily attainable, a light modulation index is found that marks the onset of diverging from the error rate given by the ratio between receiver noise power and received 16-QAM signal power, while considering a light modulation index corresponding to usable transmission margin so as to set the light modulation index of 16-QAM signals.

The following is a description of the derivation and validity of the above equation (2):

$$P^{(I+G)}(e) = \frac{2(M - \sqrt{M})}{M} \exp(-A) \sum_{j=0}^{\infty} \frac{A^j}{j!} \text{erfc}\left(\frac{\sqrt{CNR}}{\sqrt{2} (\sqrt{M} - 1) \sigma_j}\right) \quad (2)$$

In the optical transmission system for frequency division multiplexing signals and directly intensity-modulating the LD lights under the condition that the total amount of the light modulation indexes of signals to be transmitted is 1 or more, a momentary clipping-induced distortion occurs in a wide range. Assume that the statistical characteristics of this distortion is the same as that of impulse noise and take the optical transmission parameter into account, the error rate of M-QAM signal can be approximated as the equation (2).

In the equation, "A" is an impulse index and is defined as the product between the duration of one momentary distortion and the number of momentary distortions per unit time. $\sigma_J$ is defined as $(J/A+G')/(i+G')$, and $G'$ is defined as the ratio between the average thermal noise power ($\sigma_G^2$) and the average momentary distortion power ($\sigma_J^2$). As the impulse index A, an equation shown below is substituted, which shows the rate that multiplexed signals to be transmitted are clipped per unit time.

$$A = \int_{-\infty}^{0} \frac{\exp\{-(x-1)^2/2\sigma_0^2\}}{\sqrt{2\pi\sigma_0^2}} dx \quad (3)$$

In the equation, $\sigma_O^2$ is the dispersion of amplitude value of standardized multiplexed signals. As the average momentary distortion power ($\sigma_J^2$), the average clipping-induced distortion power is substituted as shown in an equation (4) below which is described in "Ultimate Limits of Subcarrier Multiplex lightwave Transmission" by K. Alahem and R. A. Minasjan, IEE Electronics Letter Jul. 4, 1991 Vol. 27, No. 14.

$$\sigma_{12} = S_n(f)B \quad (4)$$

$$S_n(f) = F[R_n(\tau)] \quad (5)$$

$$= F\left[\sum_{k=2}^{\infty} \frac{h_k^2}{k!} \text{sinc}^k(n\pi B\tau)\cos^k(2\pi f_0\tau)\right]$$

In the equation (4) above, B is the band of M-QAM signals to be transmitted, and Sn(f) is the Fourier transformation of Rn(τ) in equation (5).

Figure 5:
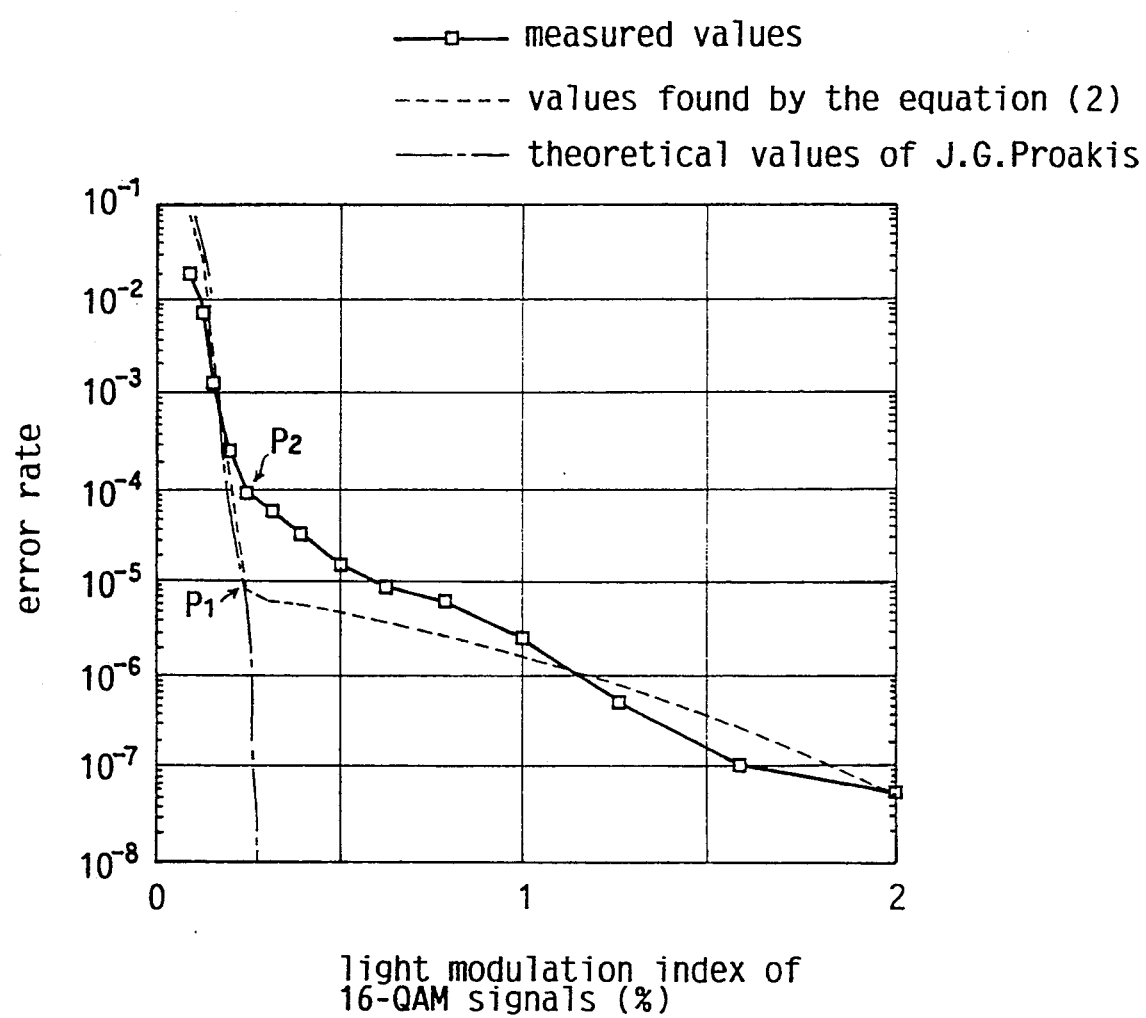
FIG. 5 is a graph showing an error rate found by an equation (2), another error rate actually measured when 16-QAM signals are transmitted, and another error rate corresponding to the relationship between the CNR and error rate described in the document by J. G. Proakis.

FIG. 5 shows the error rate found by the equation (2), another error rate actually measured when 16-QAM signals are transmitted, and another error rate corresponding to the relationship between the CNR and error rate described in the document by J. G. Proakis.

As apparent from the graph, the error rate found by the equation (2) and the actually measured value coincide in that they both contain inflection points (indicated by $P_1$ and $P_2$ in the graph) that is not lowered when the error rate is lowered to some extent, by how high the index of light modulation of 16-QAM signal is raised. Thus, the error rate can not be improved just by increasing the light modulation index of the M-QAM signal; to the contrary, such an increase of the error rate leads to the growth of the amount of distortion in the optical transmission system.

Hence, a light modulation index set by calculating the light modulation index that marks the onset of diverging from the error rate given by the ratio between receiver noise power and the M-QAM signal power while considering a light modulation index corresponding to usable transmission margin becomes most efficient index in terms of error rate and the amount of distortion of the optical transmission system.

Thus, multiplexed signals having predetermined light modulation indexes are transmitted via the optical fiber 3 and converted into electric signals by the photo receiver 21. The tuner 22 selects signals from the multiplexed signals converted into electric signals and outputs them to the demodulator 23. The demodulator 23 demodulates 16-QAM signals into digital signals. The digital signals which have been demodulated have their errors corrected by the error corrector 24 and thereby become digital signals with a required error rate.

Although the light modulation index of M-QAM signals is set with the use of equation (2) in this embodiment, it may be set by actually measuring the light modulation index that marks the onset of diverging from the error rate given by the ratio between receiver thermal noise power and the received signal power while considering a light modulation index corresponding to usable transmission margin, when the total sum of the light modulation indexes of signals to be transmitted is beyond 1.

In addition, even if signals being transmitted are M-QAM signals only, or the light modulation index does not change depending on the types of signals being transmitted, such a setting of the light modulation index is effective when the total sum of the light modulation indexes of signals to be transmitted is 1 or more because of the existence of clipping-induced momentary distortion.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of setting a light modulation index in an optical transmission system that frequency division multiplexes a plurality of modulation signals including at least one digital modulation signal, and that light intensity modulates the multiplexed signals whose total sum of modulation indices is beyond 1, comprising the steps of:

measuring light modulation indices and error rates of signals transmitted over the transmission system, the signals having a total sum of modulation indices greater than 1;

determining a relationship between a light modulation index and an error rate including an inflection point after which the error rate does not decrease any more even if the light modulation index of the digital modulation signal is increased;

determining a light modulation index of the digital modulation signal by the use of the inflection point; and setting the determined light modulation index for the transmission of signals across the optical transmission system.

2. The method of claim 1, wherein the digital modulation signal is an M-QAM signal.

3. The method of claim 2, wherein the relationship is found by an equation below:

$$P^{(I+G)}(e) = \frac{2(M - \sqrt{M})}{M} \exp(-A) \sum_{j=0}^{\infty} \frac{A^j}{j!} \text{erfc}\left( \frac{\sqrt{CNR}}{\sqrt{2} \ (\sqrt{M} - 1) \ \sigma_j} \right)$$

wherein M is the M in the M-QAM signal, A is an impulse index, which is the product between the duration of one momentary distortion and the number of momentary distortions per unit time, $\sigma_j^2$ is $(J/A+G')/(1+G')$ and G' is the ratio between an average thermal noise power $(\sigma_G^2)$ and an average momentary distortion power $(\sigma_I^2)$.

4. The method of claim 3, wherein the modulation signals include AM signals and the light modulation index of the AM signals is larger than the light modulation index of the M-QAM signal.

5. The method of claim 1, wherein the measurement is made by applying different light modulation indexes of the digital modulation signal for the transmission and then actually measuring the error rate in each of the light modulation indexes at the side of a receiver.

6. A method of setting a light modulation index of an M-QAM signal in a CATV system that frequency division multiplexes an AM signal in a channel and an M-QAM signal in another channel, and that light intensity modulates the frequency division multiplexed signals under a condition where the total sum of the light modulation indices of each of the signals is 1 or more, comprising the steps of:

measuring light modulation indices and corresponding error rates of signals transmitted over the CATV system, the signals having a total sum of modulation indices greater than 1;

determining a curve which sets forth a relationship between a light modulation index and an error rate including an inflection point from which the error rate does not decrease any more even if the light modulation index of the M-QAM signal is increased;

determining a light modulation index of the M-QAM signal by the use of the curve; and setting the determined light modulation index for the transmission of M-QAM signals across the optical transmission system.

7. The method of claim 6, wherein the curve is found by an equation below:

$$P^{(I+G)}(e) = \frac{2(M - \sqrt{M})}{M} \exp(-A) \sum_{j=0}^{\infty} \frac{A^j}{j!} \text{erfc}\left( \frac{\sqrt{CNR}}{\sqrt{2} \ (\sqrt{M} - 1) \ \sigma_j} \right)$$

wherein M is the M in the M-QAM signal, A is an impulse index, which is the product between the duration of one momentary distortion and the number of momentary distortions per unit time, $\sigma_j^2$ is $(j/A+G')/(1+G')$ and G' is the ratio between an average thermal noise power $(\sigma_G^2)$ and an average momentary distortion power.

8. The method of claim 6, wherein the measurement is made by applying different light modulation indexes of the digital modulation signal for transmission and then actually measuring the error rate in each of the light modulation indexes at the side of a receiver.

9. An optical transmission system including a transmitting station that light intensity modulates a plurality of modulation signals, including at least one digital modulation signal, whose total sum of modulation indices is beyond 1, and a receiving station having a receiver comprising:

modulation means for generating a plurality of modulation signals;

frequency division multiplex means for frequency division multiplexing all of the modulation signals;

light intensity modulation means for light intensity modulating the frequency division multiplexed signals; and modulation index adjustment means for adjusting the light modulation index of the digital modulation signal , prior to the light intensity modulation means, to a set value that marks an onset of diverging from an error rate given by a ratio between receiver thermal noise power and received signal power, while maintaining a light modulation index within a usable transmission margin.

10. The optical transmission system of claim 9, wherein the digital modulation signal is an M-QAM signal and the modulation means includes a modulation unit modulating the QAM signal.

11. The optical transmission system of claim 10, wherein the light intensity modulation means is composed of a laser diode and a driving unit means for driving the laser diode.

12. The optical transmission system of claim 11 further comprising error rate correction means connected to the receiver of the intensity modulated light.

13. A CATV system that frequency division multiplexes an AM signal in a channel and an M-QAM signal in another channel and light-intensity modulates the multiplexed signals for transmission to a receiver, comprising:

AM modulation means for generating an AM signal at a predetermined channel;

M-QAM modulation means for generating an M-QAM signal at another channel;

frequency division multiplex means for frequency division multiplexing the signals of each of the channels;

light intensity modulation means for modulating light intensity by the multiplexed signals; and light modulation index adjustment means for adjusting the light modulation index of the M-QAM signal to a set value that marks an onset of diverging from an error rate given by ratio between receiver thermal noise power and received signal power, while maintaining a light modulation index within a usable transmission margin.

14. The CATV system of claim 13, wherein the light intensity modulation means is composed of a laser diode and a driving unit means for driving the laser diode.

15. The CATV system of claim 14, wherein the curb is made by applying different light modulation indexes of the digital modulation signal for the transmission and then actually measuring the error rate in each of the light modulation indexes at the side of a receiver.

16. The CATV system of claim 14 further comprising error rate correction means connected to the receiver of intensity modulated light.

17. The CATV system of claim 13 wherein the light modulation index adjustment means determines the set value based on the following relationships:

$$P^{(I+G)}(e) = \frac{2(M - \sqrt{M})}{M} \exp(-A) \sum_{j=0}^{\infty} \frac{A^j}{j!} \operatorname{erfc}\left(\frac{\sqrt{CNR}}{\sqrt{2}\,(\sqrt{M}-1)\,\sigma_j}\right)$$

wherein M is the M in the M-QAM signal, A is an impulse index, which is the product between the duration of one momentary distortion and the number of momentary distortions per unit time $\sigma_j^2$ is $(j/A + G')/(1+G')$ and $G'$ is the ratio between an average thermal noise power ($\sigma_G^2$) and an average momentary distortion power ($\sigma_I^2$).

* * * * *